(12) United States Patent
Chen et al.

(10) Patent No.: US 11,393,101 B2
(45) Date of Patent: Jul. 19, 2022

(54) POSITION NODE TRACKING

(71) Applicant: Harman International Industries, Incorporated, Stamford, CT (US)

(72) Inventors: Mien Chin Chen, Richardson, TX (US); Sagar Shelke, Dallas, TX (US)

(73) Assignee: Harman International Industries, Incorporated, Stamford, CT (US)

( * ) Notice: Subject to any disclaimer, the term of this patent is extended or adjusted under 35 U.S.C. 154(b) by 208 days.

(21) Appl. No.: 16/799,731

(22) Filed: Feb. 24, 2020

(65) Prior Publication Data
US 2021/0264616 A1  Aug. 26, 2021

(51) Int. Cl.
| | |
|---|---|
| G06T 7/20 | (2017.01) |
| G06T 7/70 | (2017.01) |
| H04R 3/12 | (2006.01) |
| H04R 1/40 | (2006.01) |
| G06F 3/01 | (2006.01) |
| G06V 40/20 | (2022.01) |

(52) U.S. Cl.
CPC .......... G06T 7/20 (2013.01); G06T 7/70 (2017.01); G06F 3/017 (2013.01); G06V 40/20 (2022.01); H04R 1/403 (2013.01); H04R 3/12 (2013.01)

(58) Field of Classification Search
CPC .. G06T 7/20; G06T 7/70; G06F 3/017; H04R 2430/20; H04R 2499/13; H04R 1/403; H04R 3/12; G06K 9/00335; G06V 40/20
See application file for complete search history.

(56) References Cited

U.S. PATENT DOCUMENTS

| | | | |
|---|---|---|---|
| 2008/0273087 A1 | 11/2008 | Blom | |
| 2013/0086674 A1 | 4/2013 | Horvitz | |
| 2013/0259238 A1* | 10/2013 | Xiang | H04S 7/303 381/17 |
| 2015/0036848 A1 | 2/2015 | Donaldson | |
| 2015/0117830 A1 | 4/2015 | Faaborg | |
| 2017/0195789 A1* | 7/2017 | Higure | H04H 20/61 |
| 2017/0195815 A1 | 7/2017 | Christoph | |
| 2018/0063665 A1 | 3/2018 | Walker | |
| 2018/0317036 A1 | 11/2018 | Hayashi | |
| 2018/0338214 A1* | 11/2018 | Leuschner | H04S 7/303 |

(Continued)

FOREIGN PATENT DOCUMENTS

| | | |
|---|---|---|
| CN | 208798169 U | 4/2019 |
| EP | 2871906 A1 | 5/2015 |

(Continued)

*Primary Examiner* — Syed Haider
(74) *Attorney, Agent, or Firm* — Angela M. Brunetti

(57) ABSTRACT

A system and method for tracking a position node for one or more moving objects, the tracking including scanning for one or more moving objects, detecting one or more moving objects, creating a temporary position node around one or more detected moving objects, searching a node pool for an existing position node nearby the temporary position node, setting a timer for the existing position node that is nearby the temporary position node, the timer has a predetermined time limit, and for a temporary position node that is not nearby an existing position node, creating a new position node that is added to the node pool and setting a timer associated with the new position node, the timer associated with the new position node has a predetermined time limit.

18 Claims, 11 Drawing Sheets

(56) References Cited

U.S. PATENT DOCUMENTS

| | | | |
|---|---|---|---|
| 2019/0116452 A1 | 4/2019 | Shi et al. | |
| 2020/0177994 A1* | 6/2020 | Davis | .................... H04R 3/005 |
| 2021/0076152 A1* | 3/2021 | Leppanen | ............... H04S 7/302 |

FOREIGN PATENT DOCUMENTS

| | | |
|---|---|---|
| WO | 2004075601 A1 | 9/2004 |
| WO | 2007110477 A1 | 10/2007 |
| WO | 2011022577 A1 | 2/2011 |
| WO | 2013087084 A1 | 6/2013 |
| WO | 2019183727 A1 | 10/2019 |

* cited by examiner

POSITION NODE TRACKING

CROSS-REFERENCE TO RELATED APPLICATIONS

The present disclosure is related to U.S. application Ser. No. 16/799,720 Automatic Beamforming and U.S. application Ser. No. 16/799,746 Automatic Calibration, all of which were filed simultaneously on Feb. 24, 2020.

TECHNICAL FIELD

The present disclosure relates to position node tracking using dynamitic vision sensors (DVS).

BACKGROUND

The sweet spot of a Hi-Fi audio system is the ideal listening position and an important factor to ensure a listener receives the best sound quality within a listening environment. In a traditional Hi-Fi audio system, a technician will determine the sweet spot and configure the audio system according to a user's request. Once this setup has been performed, the sweet spot remains fixed.

Beamforming loudspeakers introduced an improvement that allows users to adjust the sweet spot location according to their desired configuration. This is typically accomplished in a system with a pair of beamforming loudspeakers capable of communicating with an application software on a device such as, a mobile phone, tablet, laptop, etc. By configuring a graphical menu that maps the relative location of two speakers on the application, a user may set a preferred listening location within the listening environment. The loudspeakers will steer the sound beam and adjust a strength of the sound beam towards the desired listening location. However, the graphical menu does not include information pertaining to the real listening environment. During a first installation of the Hi-Fi audio system dimensions of the relative location of the two speakers is unknown. Typically, a technician installing the audio system will determine the sweet spot location and measure a distance between the left and right speakers. The technician enters this measured distance into the user's mobile application as a baseline parameter. Once the measurement is complete and entered, the user may adjust the sweet spot location by way of their mobile application. In theory, the user should be able to steer the sound to a location where the user prefers to listen by dragging an icon representing the sweet spot within an area that represents the listening environment on a display of the mobile device.

There are drawbacks associated with this method. Most users are not certain if the location where they are standing really matches the sweet spot shown on the application because the application software does not have the capacity to track the user's location. In practice, the user must use trial and error in order to match the configuration menu to the real environment. Furthermore, if a location of the speakers is changed, the baseline parameter will change, and a technician must be brought in to repeat the installation procedure.

SUMMARY

A system and method for tracking a position node for one or more moving objects, the tracking including scanning for one or more moving objects, detecting one or more moving objects, creating a temporary position node around one or more detected moving objects, searching a node pool for an existing position node nearby the temporary position node, setting a timer for the existing position node that is nearby the temporary position node, the timer has a predetermined time limit, and for a temporary position node that is not nearby an existing position node, creating a new position node that is added to the node pool and setting a timer associated with the new position node, the timer associated with the new position node has a predetermined time limit.

In another example, when none of the objects in an existing position node move before expiration of the timer associated with the existing position node, the existing position node is delisted from the node pool.

In another example, when at least one of the objects in an existing position node moves before expiration of the timer associated with the existing position node, the timer associated with the existing position node is reset and the existing position node remains in the node pool.

In yet another example, when at least one of the objects in an existing position node moves outside of, but remains nearby, the existing position node, a new position node is created replacing the existing position node and a timer associated with the new position node is set, the existing position node is delisted from the node pool.

In still another example, when at least one of the objects in an existing position node moves to a position outside of the existing position node, a new position node is created to replace the existing position node, a timer associated with the new position node is set, and the existing position node remains for the duration of the timer associated with the existing position node.

In a further example, when there are two or more existing position nodes in the node pool and one or more objects come close to each other, the two or more existing position nodes are combined into one position node, a timer associated with the one position node will be reset and the other existing position nodes will be delisted from the node pool.

Elements and steps in the figures are illustrated for simplicity and clarity and have not necessarily been rendered according to any sequence. For example, steps that may be performed concurrently or in different order are illustrated in the figures to help to improve understanding of embodiments of the present disclosure.

DETAILED DESCRIPTION

While various aspects of the present disclosure are described with reference to a beamforming loudspeaker system in a listening environment, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

Figure 1:
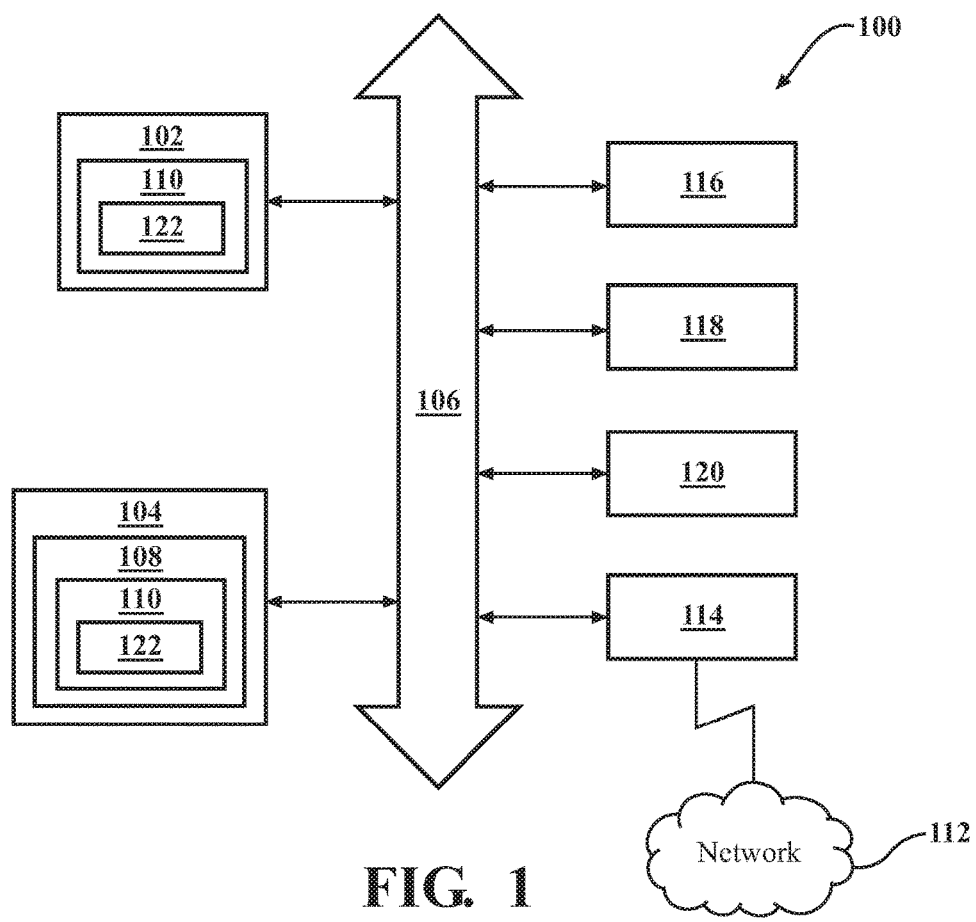
FIG. 1. is an example electronic device that may include one or more aspects of an Automatic Beamforming (ABF) system.

FIG. 1 is a block diagram of an example electronic device 100 that may include one or more aspects of an example position node tracking system. The electronic device 100 may include a set of instructions that can be executed to cause the electronic device 100 to perform one or more of the methods and computer based functions, such as detecting a user, creating one or more position nodes associated with the user, tracking one or more position nodes in a node pool, detecting a gesture, calculating an angle and distance between the loudspeakers and a user, configuring a sweet spot, steering a sound beam based on the calculated angle and adjusting a beam strength and propagation delay based on the calculated distance. The electronic device 100 may operate as a standalone device, may be included as functionality within another device, or may be connected, such as using a network, to other computer systems, devices or peripheral devices.

In the example of a networked deployment, the electronic device 100 may operate in the capacity of a server or as a client user computer in a server-client user network environment, as a peer computer system in a peer-to-peer (or distributed) network environment, or in various other ways. The electronic device 100 may also be implemented as, or incorporated into, various electronic devices such as desktop and laptop computers, hand-held devices such as smartphones and tablet computers, portable media devices such as recording, playing, and gaming devices, household appliances, office equipment, set-top boxes, automotive electronics such as head units and navigation systems, or any other machine capable of executing a set of instructions (sequential or otherwise) that result in actions to be taken by that machine. The electronic device 100 may be implemented using electronic devices that provide voice, audio, video and/or data communication. While a single electronic device 100 is illustrated, the term "device" may include a collection of devices or sub-devices that individually or jointly execute a set or multiple sets of instructions to perform one or more electronic functions of the ABF system, described in detail hereinafter.

The electronic device 100 may include a processor 102, such as a central processing unit (CPU), a graphics processing unit (GPU) or both. The processor 102 may be a component in a variety of systems. For example, the processor 102 may be part of a beam steering loudspeaker. Also, the processor 102 may include one or more general processors, digital signal processors, application specific integrated circuits, field programmable gate arrays, servers, networks, digital circuits, analog circuits, combinations thereof, or other now known or later developed devices for analyzing and processing data. The processor 102 may implement a software program, such as code generated manually or programmed.

The electronic device 100 may include memory, such as a memory 104 that can communicate via a bus 106. The memory 104 may be or include a main memory, a static memory, or a dynamic memory. The memory 104 may include a non-transitory memory device. The memory 104 may also include computer readable storage media such as various types of volatile and non-volatile storage media including random access memory, read-only memory, programmable read-only memory, electrically programmable read-only memory, electrically erasable read-only memory, flash memory, a magnetic tape or disk, optical media and the like. Also, the memory may include a non-transitory tangible medium upon which software is stored. The software may be electronically stored as an image or in another format (such as through an optical scan), then compiled, or interpreted or otherwise processed.

In one example, the memory 104 includes a cache or random-access memory for the processor 102. In alternative examples, the memory 104 may be separate from the processor 102, such as a cache memory or a processor, the system memory, or other memory. The memory 104 may be or include an external storage device or database for storing data. Examples include a hard drive, compact disc, digital video disc, universal serial bus, memory stick, floppy disc, or other device to store data. For example, the electronic device 100 may include a computer-readable medium 108 in which one or more sets of software or instructions can be embedded. The processor 102 and memory 104 may also include a non-transitory computer-readable storage medium with instructions or software.

The memory 104 may be operable to store instructions executable by the processor 102. The functions, acts, or tasks illustrated in the figures or described may be performed by the programmed processor 102 executing the instructions stored in the memory 104. The functions, acts or tasks may be independent of the type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

The instructions may include one or more of the methods described herein, including aspects of the electronic device 100 and/or the ABF system 122. The instructions 110 may reside completely, or partially, within the memory 104 or within the processor 102 during execution by the electronic device 100.

The electronic device 100 may include a non-transitory computer-readable medium that includes the instructions 110 or receives and executes the instructions 110 responsive to a propagated signal so that a device connected to a network 112 can communicate voice, video, audio, images, or other data over the network 112. The instructions 110 may be transmitted or received over the network 112 via a communication port or interface 114 or using a bus 106. The communication port or interface 114 may be a part of the processor 102 or may be a separate component. The communication port or interface 114 may be created in software or may be a physical connection in hardware. The communication port or interface 114 may be configured to connect with the network 112, external media, one or more speakers 116, one or more cameras 118, one or more sensors 120, or other components in the electronic device 100, or combinations thereof. The connection with the network 112 may be a physical connection, such as a wired Ethernet connection or may be established wirelessly. The additional connections with other components of the electronic device 100 may be physical connections or may be established wirelessly. The network 112 may alternatively be directly connected to the bus 106.

The electronic device may include one or more speakers 116, such as beamforming loudspeakers, installed in a vehicle, living space or venue. The speakers 116 may be part of a stereo surround sound system and ABF system 122.

In order to carry out the functions of the ABF system 122, the processor 102 or other components may manipulate, or process sound signals sent to speakers 116. Particularly, when speakers 116 comprise beamforming loudspeakers, sound signals may be sent to each speaker in a speaker pair. The signals may be processed separately or jointly. The electronic device 100 may include instructions for adjusting a phase, amplitude, and/or delay of each sound signal delivered to speakers 116. The phase, amplitude and/or delay may be controlled in such a manner to produce a desired coverage pattern.

The electronic device 100 may also include one or more sensors 120. The one or more sensors may include one or more proximity sensors, motion sensors, cameras, and dynamitic vision sensors (DVS).

Figure 2:
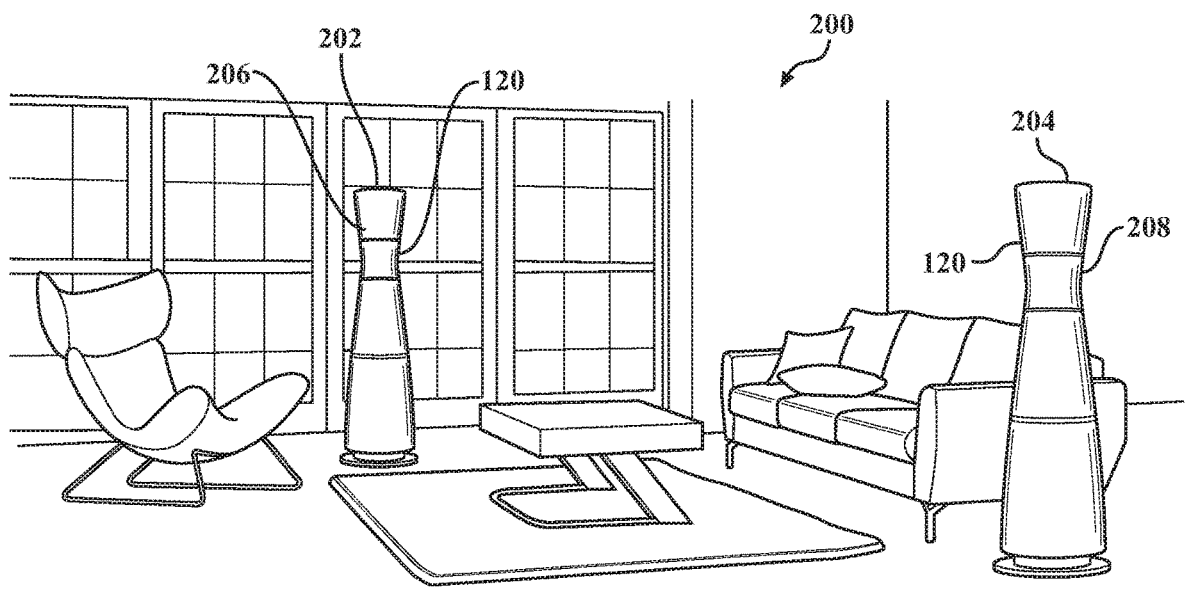
FIG. 2 is an example of a listening environment.

FIG. 2 shows an example of a listening environment 200 within which the electronic device may operate. In the example shown, a master loudspeaker 202 has a first detection set 206 including sensors 120. A slave loudspeaker 204 has a second detection set 208 including sensors 120. The master 202 and slave 204 loudspeakers may be left and right beamforming loudspeakers of a speaker pair controlled by the electronic device 100 to steer a sound beam to any angle of 360 degrees creating a surround sound system. The first detection set 206 and the second detection set 208 have sensors 120 capable of detecting objects and gestures in the listening environment. The sensors 120 may be any of, but not limited to, motion sensors, thermal sensors, vision sensors, and cameras.

Figure 3:
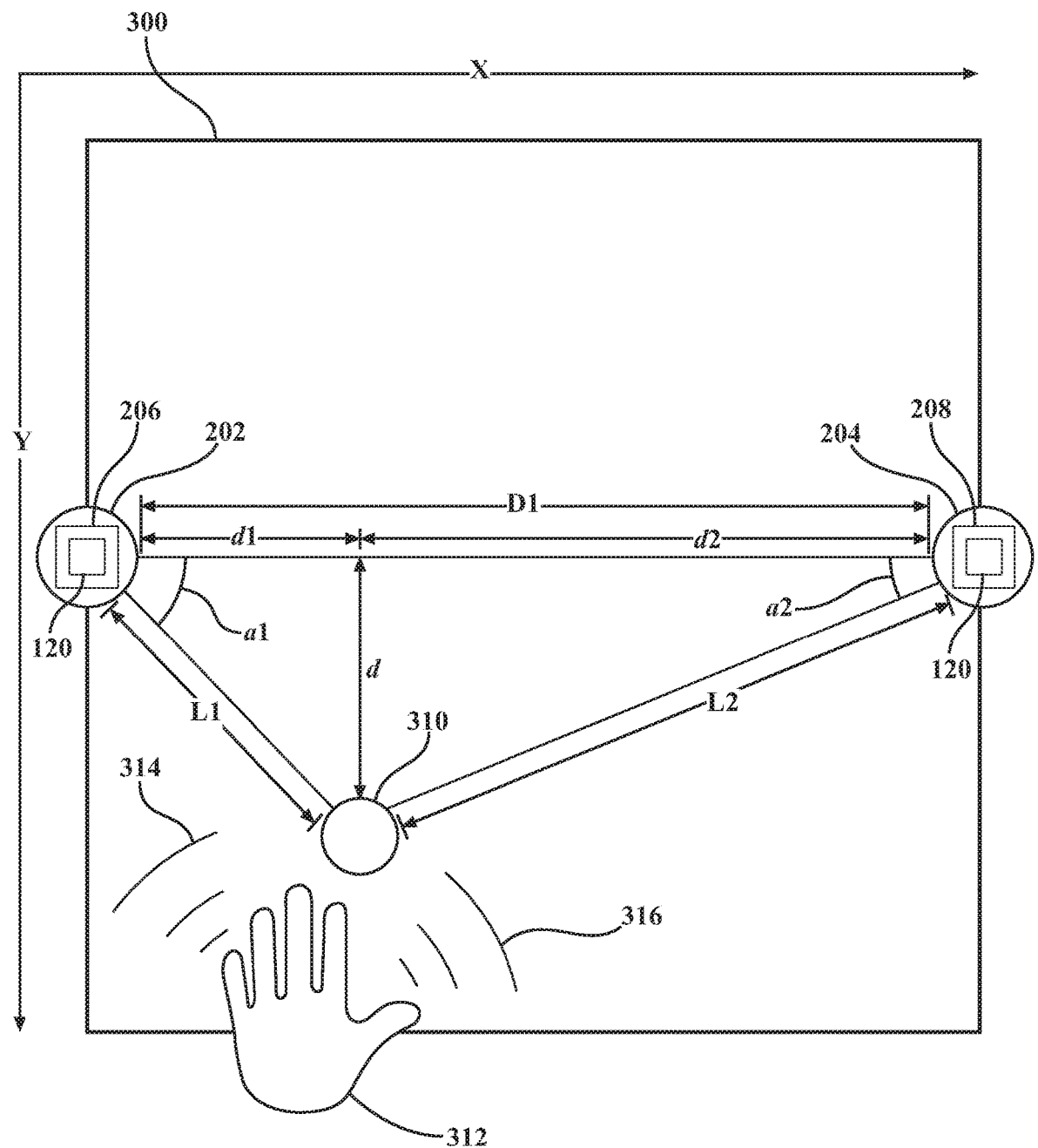
FIG. 3 is a block diagram of an example application of the ABF system.

FIG. 3 is a diagram showing variables and necessary parameters of the ABF system within the listening environment shown in FIG. 2. Rectangle 300 represents the boundaries of the listening environment. The master 202 and the slave 204 are shown opposite each other within the listening environment and spaced a fixed distance, D1, apart along a horizontal x-axis. A sweet spot location that is desired by a user 312, is also shown and is known as a target position 310. Distance L1 is a distance from the first detection set 206 to the user 312, a distance L2 is a distance from the second detection set 208 to the user 312, and a distance, d, is the distance along a vertical y-axis from the user to the horizontal x-axis between the master 202 and slave 204.

Sensors 120 in the detection sets 206, 208 detect objects, including the user 312 and one or more gestures made by the user 312, within the listening environment. The electronic device will detect moving objects and identify which moving objects are human. Once the detected objects are identified to be human, the electronic device will track all the human objects and wait to detect a first gesture 314 from one of the human objects. If a human object performs the first gesture 314, the system will track the human object and wait for the tracked human object to perform a second gesture 316. The position of the human when performing the second gesture indicates, to the electronic device, the target position for the sweet spot setting.

Frequent switching of the sweet spot may adversely affect the performance of the speakers, so to avoid false switching of the sweet spot and to prevent false beam steering, the user performs two gestures. The first gesture is to wake up the electronic device. The second gesture is to lock the target position of the sweet spot.

The first gesture 314 is associated with waking up the electronic device to alert the device that the user 312 wants to adjust the sweet spot location. The first gesture 314 may be something like a hand wave, for example. The first gesture 314 may be detected by either, or both, of the first detection set 206 of the master 202 loudspeaker and the second detection set 208 of the slave 204 loudspeakers. Upon detecting the first gesture 314, the sensors 120 on both the master 202 and slave 204 loudspeakers will wake up and track the user 312.

A second gesture 316, that differs from the first gesture 314, is performed when the user wants to lock the location of the sweet spot. When the user 312 performs the second gesture 316, both the master 202 and the slave 204 loudspeakers will lock a position of the user 312. The second detection set 208 on the slave 204 will send its locking information to the first detection set 206 on the master 202. Upon receiving lock information from both detection sets 206, 208, the electronic device calculates and configures the sweet spot.

Figure 4:
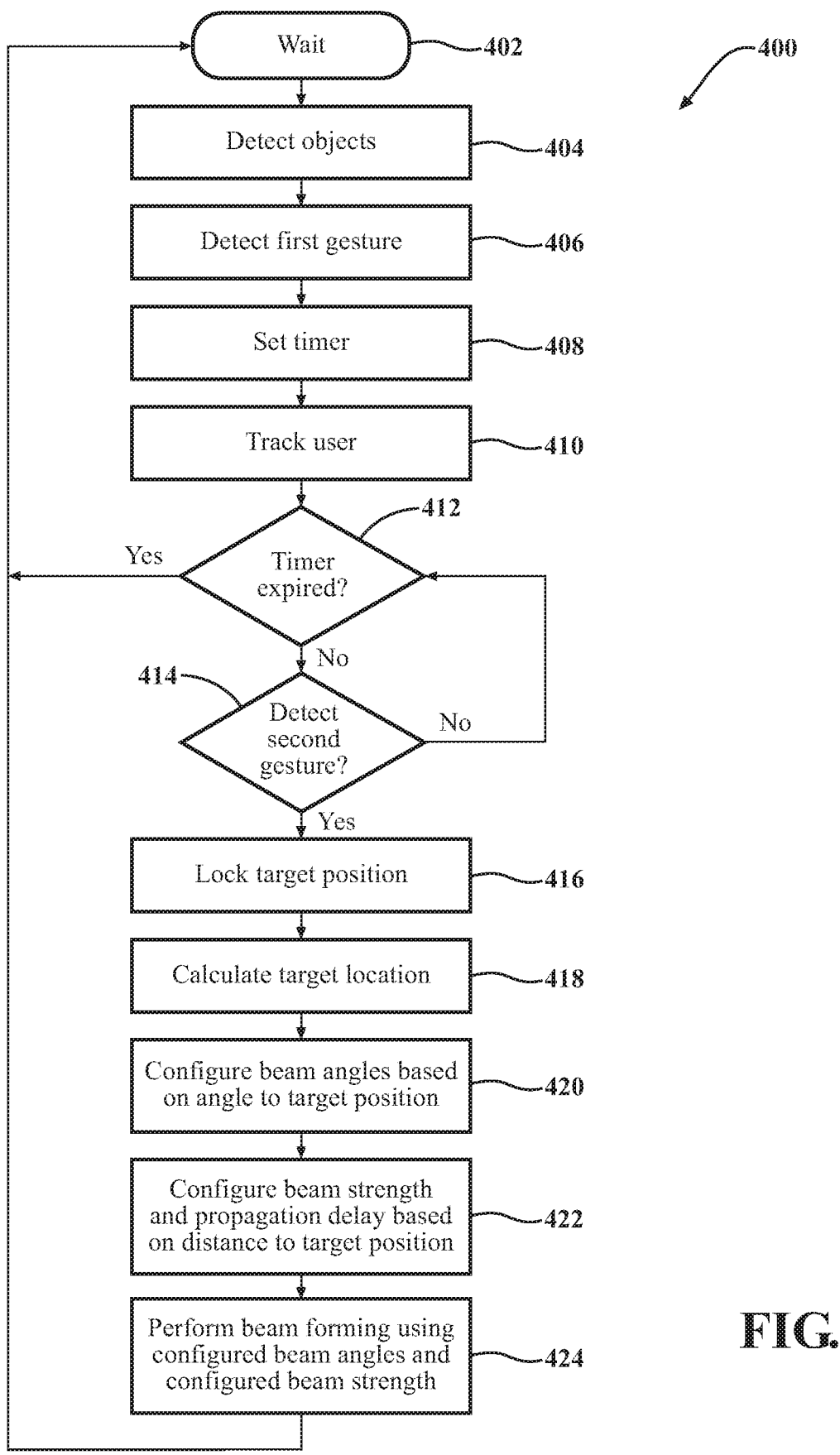
FIG. 4 is a flow chart of a general method for automatic beamforming.

FIG. 4 is a flow chart of a general method 400 for automatic beamforming. The method begins with the electronic device in a wait state 402. The electronic device detects 404 at least one object in the listening environment. The electronic device detects 406 the first gesture and enters an active state. A timer, having a predetermined time limit is set 408, and the active state lasts until the user performs the second gesture or the timer elapses. During the active state, the electronic device tracks the user (the object from which the first gesture was detected).

During the predetermined time period, the user may stay in their existing position, or alternatively, move to a position in the listening environment where the sweet spot is to be set. Because the first gesture has been detected, the electronic device is in an active state and will track 410 the user until a point in time either the timer expires 412, or the user performs the second gesture and the second gesture is detected 414.

When the timer expires and the second gesture has not been detected, the electronic device returns to the wait state 402. When the user performs a second gesture within the predetermined time period and one or more of the detection sets detects the second gesture 414, the user's location is locked 416 into the electronic device as a target position for the sweet spot location.

Upon locking 416 the target position, the electronic device has sensor information to calculate 418 the target position of the sweet spot for purposes of automatic beamforming. Referring back to FIG. 3, the target position 310 coincides with the position of the user 312 upon detecting the second gesture and is the desired sweet spot, or target position 310. The distance, D1, between the loudspeakers, is known, and is the baseline parameter. Angle a1 is the angle between the first detection set 206 and the target position 310 and is derived from sensors 120 upon detecting the second gesture and locking the target position. Angle a2 is the angle between the second detection set 208 and the target position 310 and is derived from sensors 120 upon detecting the second gesture and locking the target position.

Using a triangle function the distances, L1 and L2, may be calculated as follows:

$$\tan(a1) = d/d1; \quad (1)$$

$$\tan(a2) = d/d2; \quad (2)$$

$$d1 + d2 = D1; \quad (3)$$

$$d = D1/(1/\tan(a1)) + D1/(1/\tan(a2)) \quad (4)$$

Distance d is the distance from the baseline to the target position 310. Knowing, d, L1 and L2 may be calculated as follows:

$$L1 = d/\sin(a1); \text{ and} \quad (5)$$

$$L2 = d/\sin(a2). \quad (6)$$

Referring again to FIG. 4, the electronic device configures a beam angle 420 for each of the master and slave loudspeakers by steering a sound beam based on the detected object angles a1, a2. The electronic device configures a beam strength and propagation delay 422 for the master and slave loudspeakers by adjusting a sound beam strength and propagation delay based on the calculated distances, L1, L2. Beamforming is performed 424 using the configured beam angles, beam strengths and propagation delays. After beamforming, the electronic device returns to its "wait" state 402.

When multiple humans are present in the listening environment the electronic device identifies the first gesture made by the user to correctly identify the user as the object to be tracked. Upon detecting the first gesture, the electronic device has been alerted that this user wants to configure the sweet spot. Once the electronic device detects the second gesture, it locks the user's current location as the sweet spot.

There may be multiple operating modes associated with the electronic device. For example, a Scan and Lock mode, a Scan and Follow mode and a Party mode. The operating mode is configured on the electronic device, for example using a mobile application. The user selects the mode and, once selected, the detection sets will detect objects, track movement and detect gestures associated with the mode setting.

Figure 5:
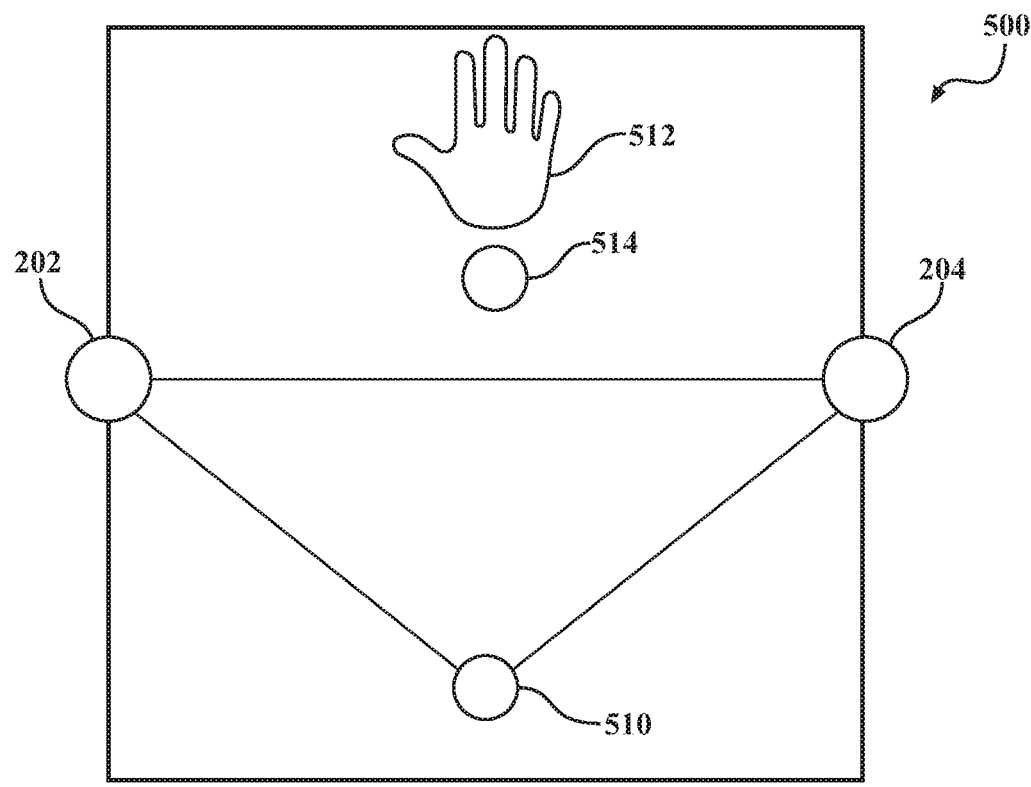
FIG. 5 is an example of Scan and Lock mode.

The Scan and Lock mode delivers stable sound quality. FIG. 5 shows an example 500 of Scan and Lock mode. The user 512 performs the first and second gestures to set the target position of the sweet spot 510 and configuration takes place for the audio beam steering settings to target position 510. Once set, the beam steering settings for the sweet spot target position 510 will be maintained at the target position even when the user 512 moves about, such as to position 514. The beamforming is directed to the target position of the sweet spot 510 and is maintained until a point in time the user performs the first and second gestures again.

Figure 6:
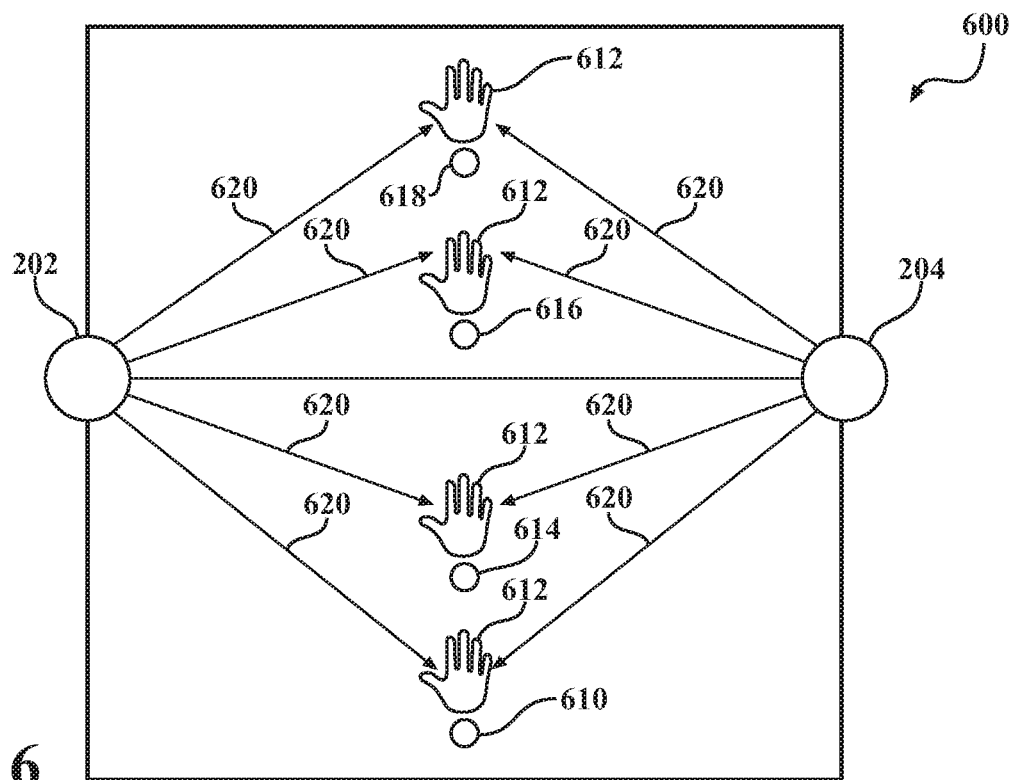
FIG. 6 is an example of Scan and Follow mode.

An example 600 for the Scan and Follow mode is shown in FIG. 6. In the Scan and Follow mode, the target position of the sweet spot 610 follows the position of the tracked user. In this mode, the user 612 performs the first and second gestures. Once the system recognizes both gestures, the electronic device will track the user 612 constantly readjusting the beamforming configurations for the sweet spot so the sound beams 620 follow the user 612 to multiple locations 614, 616, 618. In the Party mode there is effectively no target position for the sweet spot. The speakers will broadcast the audio to an entire 360°.

To carry out the method described in FIG. 4, the first and second loudspeakers need to be capable of detecting a human user's angle to direct the beam angle and distance to adjust the beam strength and propagation delay. First and foremost, there is a need for the sensors on the speaker to identify that the object is human and to detect the first and second gestures the user performs. Secondly, the processor 102 of the electronic device may collect the object angles, a1 and a2, detected by the sensors 120 and calculate the distance, L1, L2, to the object. In order to collect angles and calculate distances, the electronic device tracks the user.

As discussed above, the sensors 120 may be camera-based such as an RGB camera or a thermal camera. An RGB type of camera is very effective for identifying and tracking a human. However, there may be a privacy concern since it may expose a very clear image from a private network. A thermal camera is an alternative capable of detecting and tracking a human without revealing a clear image. However, the cost of a thermal camera is much higher than the RGB camera.

Position Node Tracking Using DVS

Yet another alternative for a sensor 120 is a dynamitic vision sensor (DVS). DVS detects object motion with enough resolution while hiding a clear image of the object and resolves privacy concerns. Further, the cost is lower than that of a thermal camera. Each of the master 202 and slave 204 loudspeakers may have four DVS to create a 360° Field of View (FOV) to detect objects and gestures.

Performing object and gesture detection with a DVS may be accomplished with fusion technology, which combines several event frames with different timestamps into a single frame providing a temporal image of an object. For object detection, this frame is fed to the processor of a neural network and object recognition is performed with a pre-trained model for object recognition. Gesture detection is performed with another pre-trained model for object classification. For gesture detection, the area of the gesture is smaller than the area of the object, so the image is zoomed-in to for more accurate detection.

However, DVS is an event-based sensor that only senses light changes on each pixel and sends out an event package with a timestamp and pixel position. The electronic device collects the event packages and recomposes them into image frames for fusion. Because DVS only detects moving objects, it may lose tracking if the object stops moving. Therefore, position node tracking is presented as an alternative to tracking algorithms applied to RGB type cameras.

Figure 7:
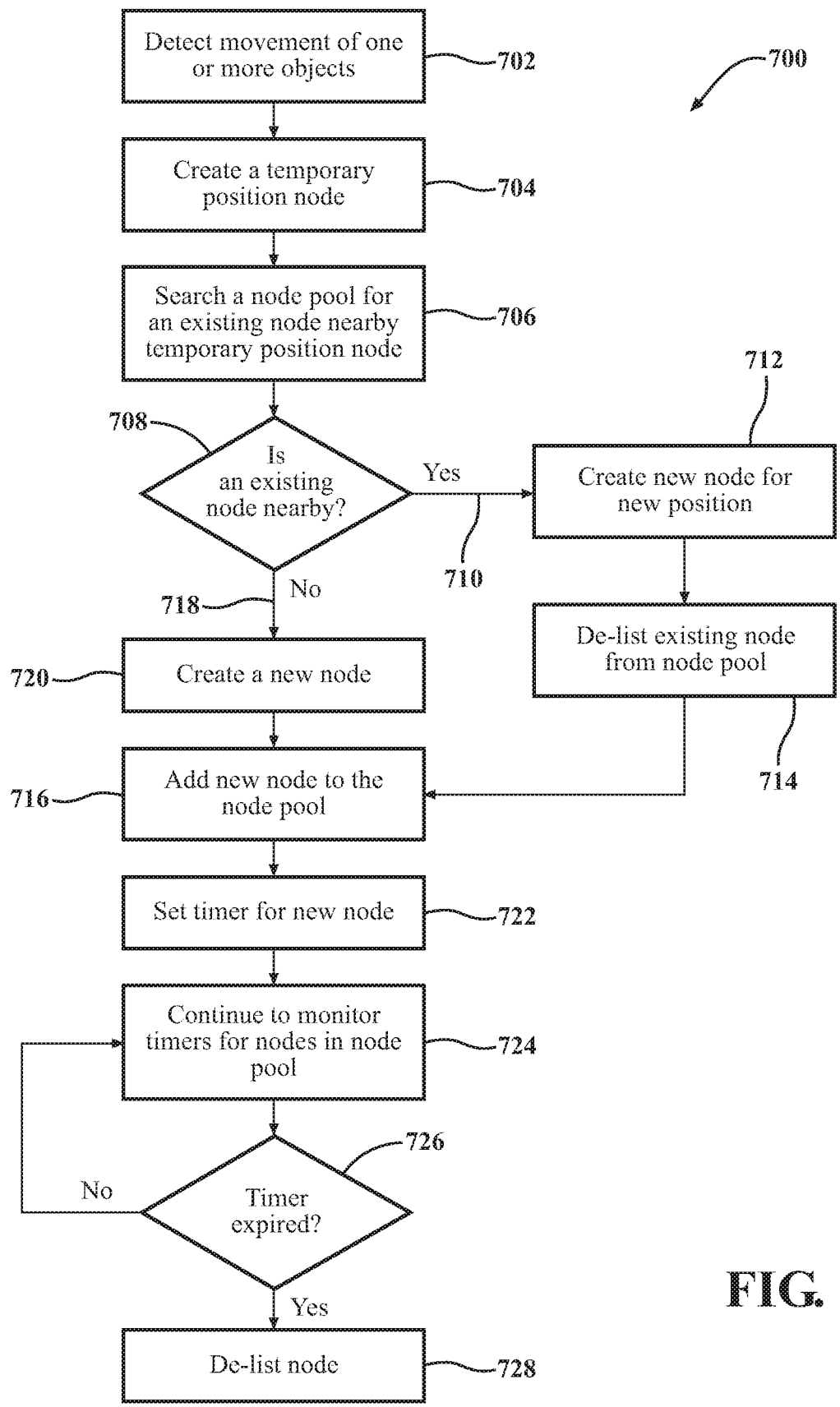
FIG. 7 is a flow chart of a method for position node tracking.

Referring to FIG. 7, a method 700 for position node tracking is described for the electronic device 100 where the sensor 120 in the detecting sets for detecting objects and gestures in the listening environment is one or more DVS. For a 360° Field of View (FOV) from a speaker, the detection set will consist of four DVS. Position node tracking is applied to the object and gesture detection steps discussed earlier herein with reference to FIG. 4. The detecting sets scan the listening environment, and upon detecting 702 one or more moving objects, the electronic device creates 704 one or more temporary position nodes. The number of temporary position nodes created will depend on a bounding box associated with each object detected and whether any bounding boxes are overlapping.

Whenever a temporary position node is created 704, the electronic device searches the existing node pool 706 for position nodes that were created in previous time stamps to determine if the temporary position node is nearby 708 any existing position nodes currently in the node pool. If any temporary node is close to a node already existing in the node pool 710, within a predetermined range, the electronic device considers this temporary node as an existing node that has moved to a new position and a new node 712 is created, the existing node is de-listed 714 from the node pool and the new node is added to the node pool 716. If no existing node is found nearby 718, the temporary node is considered new. A new node is created 720 and the new node is added to the node pool 716.

When a new node is added to the node pool a timer is set 722 to a predetermined time. Within this predetermined time, for example two minutes, the nodes are kept alive in the node pool. The electronic device continues to track 724 any activity happening within the nodes in the node pool using the timers. If a timer for a node in the node pool expires 726, that means there is an absence of any movement in the position node, and it may be assumed that the position node no longer needs to be tracked. The user, for example, may have left the area or may have fallen asleep. In order to save computing resources, the position node with an expired timer will be delisted 728 from the node pool and is no longer tracked. An active person should have at least slight movement within the predetermined time, which is enough to trigger the DVS and reset the timer associated with the position node. The timer is the key to continuously track the user.

Figure 8:
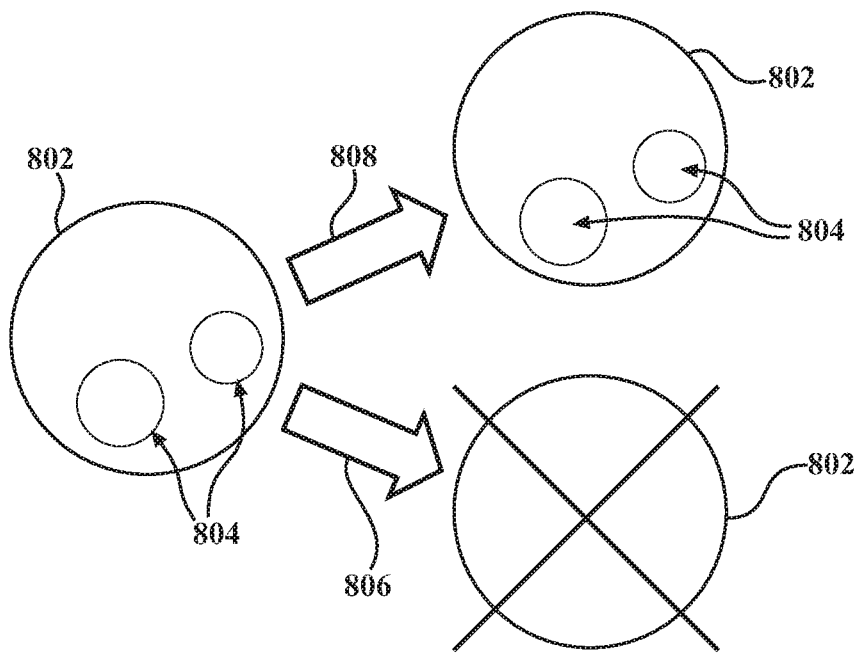
FIG. 8 shows a rule for position node tracking.

FIGS. 8 through 11 illustrate applications of position node tracking according to the method according to rules for position node tracking. Tracking the position node with a timer instead of the object is the first rule of position node tracking using DVS. In FIG. 8 a position node 802 is created around two objects 804 with a timer set for a predetermined time, such as two minutes. If there is no movement 806 by either object for more than two minutes, the position node 802 will be de-listed from the node pool. If at least one of the objects moves 808 within the existing position node before the timer expires, the timer is reset for another two minutes and the position node 802 remains alive in the node pool and tracking continues.

Figure 9:
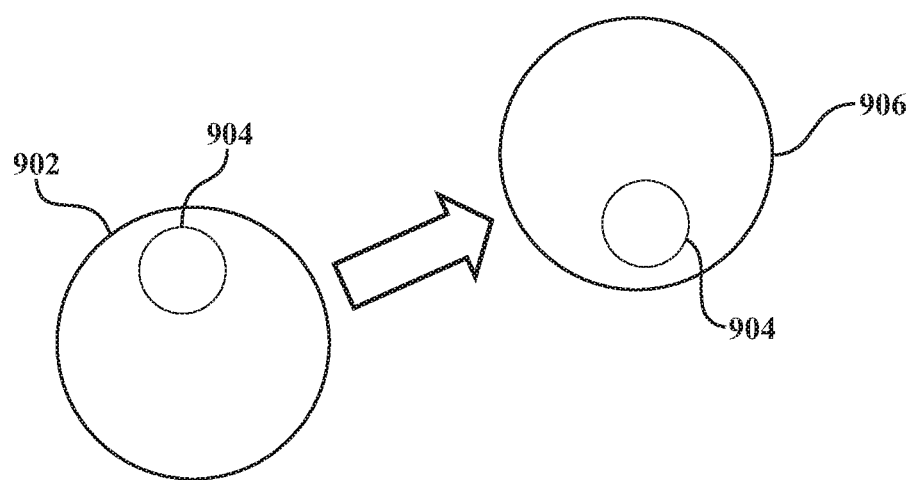
FIG. 9 shows a rule for position node tracking.

Now consider the case when an object moves outside of, but remains nearby, an existing position node. Converting the object movement to node trajectory to reduce the complexity of object tracking is the second rule of position node tracking using DVS. In FIG. 9 a position node 902 is created around a single object 904. If the object 904 moves to a new position that is nearby the existing position node, a new position node 906 is created to replace the existing position node 902. The new node 906 is added to the node pool and the existing position node 902 is de-listed from the node pool.

Figure 10:
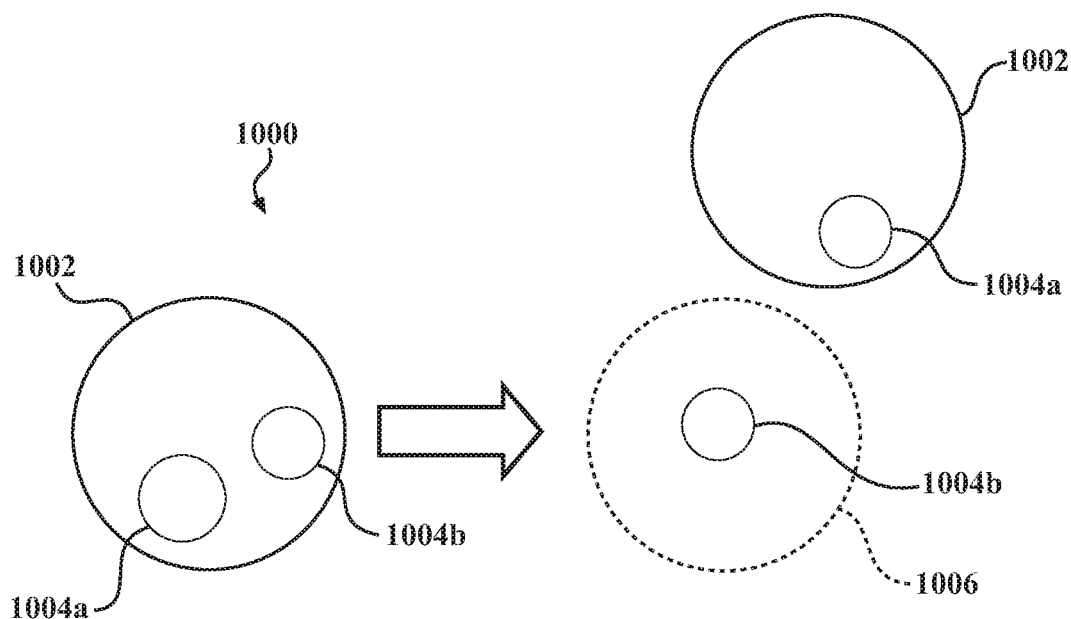
FIG. 10 shows a rule for position node tracking.

The third rule of position node tracking using DVS is that for objects that are detected but are not near each other, the electronic device tracks multiple nodes simultaneously. FIG. 10 is a case in which a position node 1002 is created around two objects 1004a and 1004b. When one object 1004b moves out of the position node 1002, a new position node 1006 is created and the original position node 1002 remains. A position node only covers a certain range. Therefore, if two objects are out of range of each other, two nodes 1002, 1006 exist in the node pool simultaneously and are tracked by their respective timers.

Figure 11:
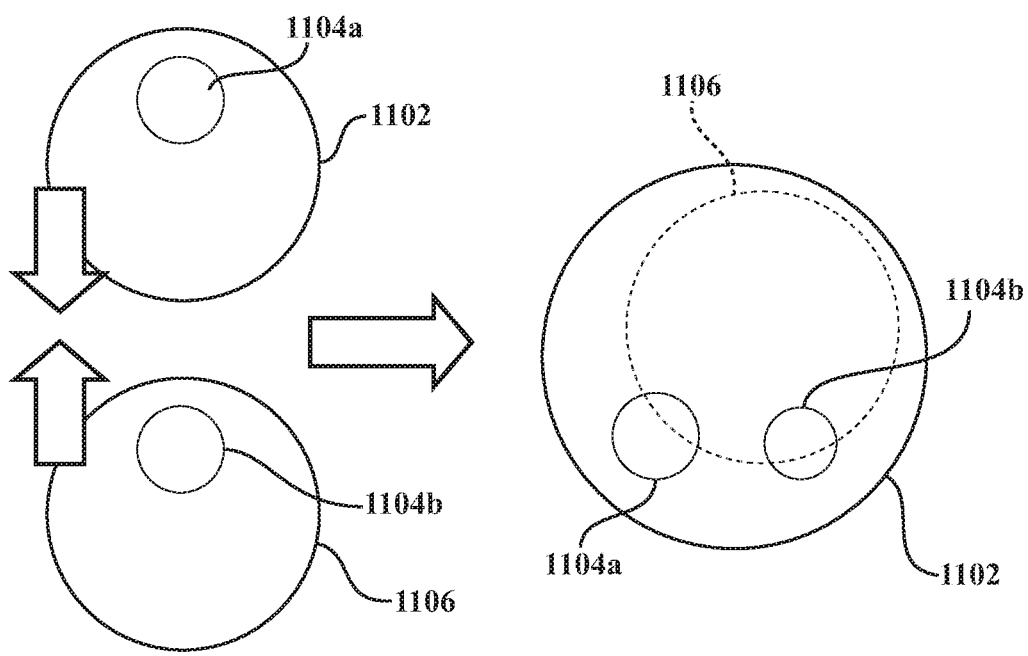
FIG. 11 shows a rule for position node tracking.

The fourth rule of position node tracking using DVS is that once more than one object come close to each other, only one of the nodes needs to be tracked, thereby reducing the complexity of tracking. FIG. 11 is a case in which a position node 1102 for an object 1104a is created and a position node 1106 for an object 1104b is created and both are alive in the node pool. The objects 1104a and 1104b may be moving and the DVS will detect when they are moving closer to each other. In this scenario, the nodes 1102 and 1106 for the two objects 1104a and 1104b will be combined into one position node, 1102 for example. A timer will be reset for node 1102 and the node will remain alive in the node pool. The remaining position node 1106, shown in dashed lines in FIG. 11, is de-listed from the node pool upon expiration of its timer.

Using rules one through four, the electronic device can track all active nodes and zoom in on certain areas for gesture detection. This increases the accuracy of gesture detection while also resolving the issue of tracking loss for objects that are not moving.

Depth Detection and Automatic Calibration

Upon detecting the user and determining that the user wants to adjust the sweet spot, the electronic device must determine an angle of the user in order to direct the sound beam and must determine the distance to the user in order to adjust the beam strength and propagation delay factor. The relative angle may be determined when each detection set locations an x-y coordinate of a position node on the sensors 120. However, a depth of the object cannot be determined from the values of the x-y coordinate. In most instances, binocular cameras are used to calculate depth based on a known baseline. In the present example, using first and second detection sets 206, 208, the baseline may be determined without the need for binocular cameras. While the present example is directed to a pair of beamforming loudspeakers, it should be noted that it may also be applied to other systems that use depth detection for purposes of object detection.

Figure 12:
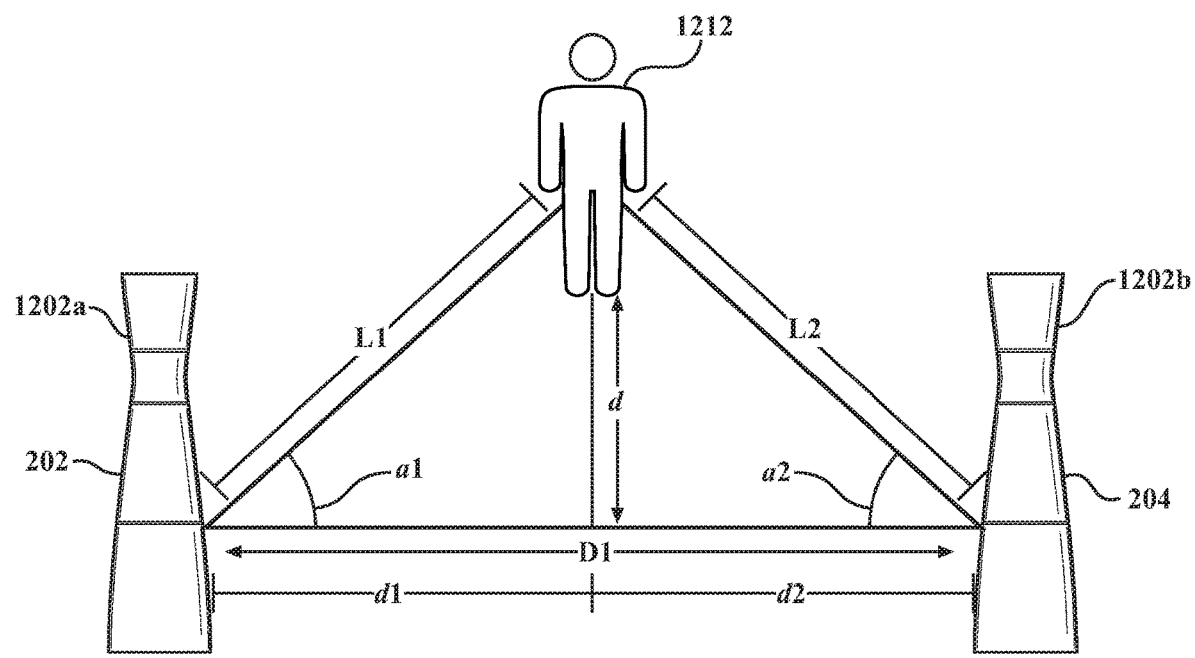
FIG. 12 is a block diagram of a speaker arrangement and a target position.

FIG. 12 shows a pair of speakers, a master 202 and a slave 204, each having a detection set 1202a, 1202b respectively. When the system has been installed, each detection set 1202a and 1202b, with two to four DVSs to generate a 180°/360° FOV and may detect, or measure, its own angle value a1, a2, by locating an object in its FOV, taking a known value for D1, the measured values of a1 and a2, and feeding them into a triangle function, the electronic device can calculate the depth, L1 and L2 as described above with reference to FIG. 3. However, there may be a need to obtain the baseline, D1, without having to manually measure. For example, when the location of the detection sets has changed from an original installation. The system described hereinafter automatically calibrates the relative location of the detection sets and the baseline, D1 for the electronic device.

Figure 13:
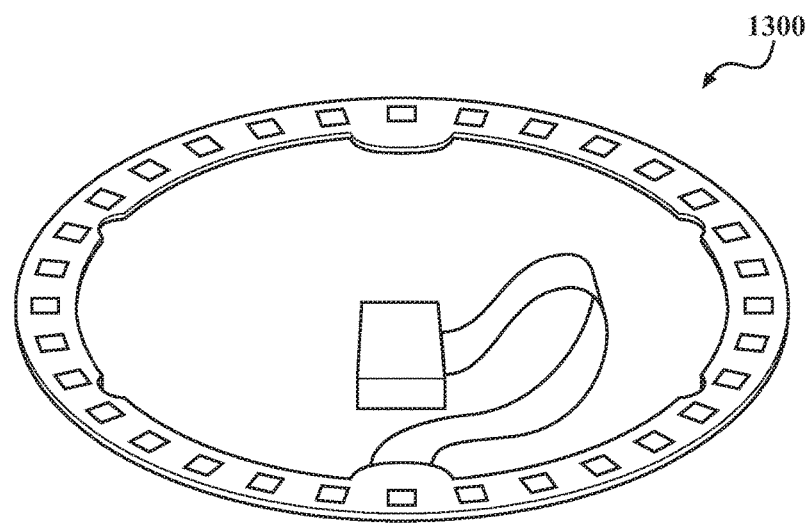
FIG. 13 is a perspective view of an LED ring.

Referring now to FIG. 13, a plurality of light sources, for example LEDs configured on an LED ring 1300, is incorporated into the slave 204. The LEDs on the LED ring 1300 are positioned on the ring and create a known pattern of light points. During calibration, the LEDs are flashed, one by one, triggering the detection set on the master. The LEDs may be flashed one at a time using an LED chaser circuit. The detection set on the master captures the flashing light points to create an image of a detected pattern of light points. The electronic device compares the captured image with images in a database of calibration patterns and, from the comparison, determines the relative location and baseline, D1, distance between the master and slave. The LEDs may be infrared so that they are invisible to human eyes.

Figure 14A:
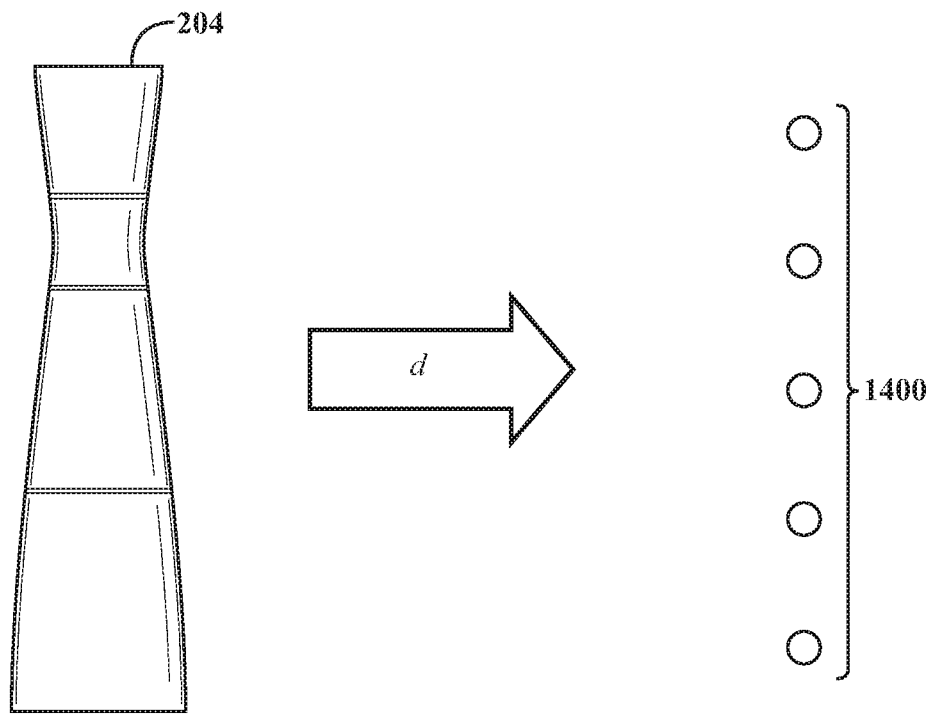
FIG. 14A is an example of a detected LED pattern.
Figure 14B:
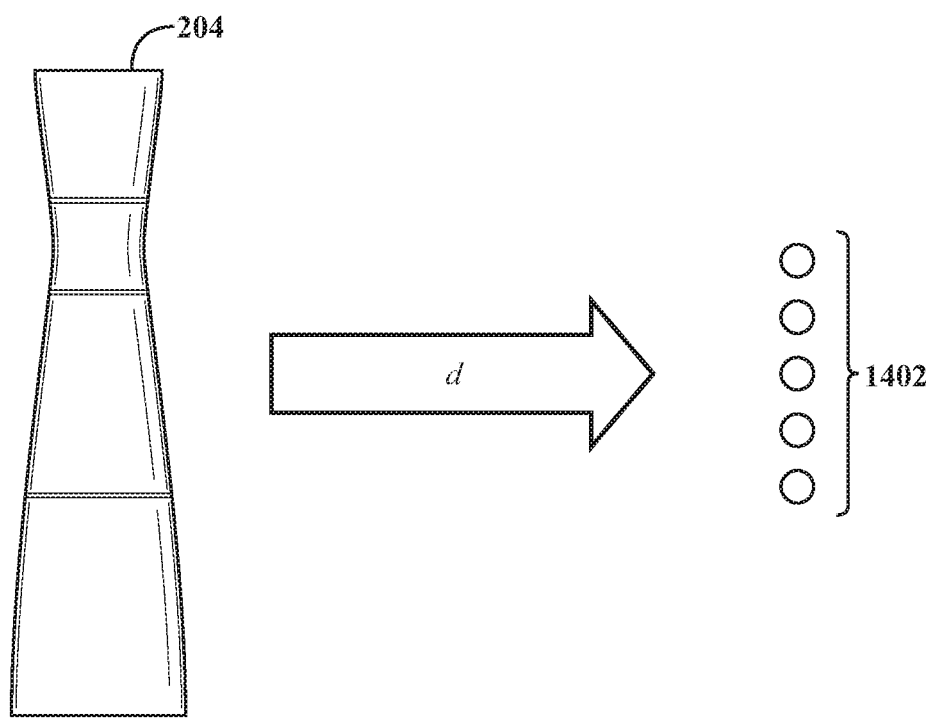
FIG. 14B is an example of a detected LED pattern.

FIGS. 14A and 14B show examples of LED patterns captured by the detection set on the master when the master and slave 204 are directly across from each other but the slave 204 is at different distances from the master. In FIG. 14A, the master (not shown) and slave 204 are spaced a short distance from each other. The image 1400 is created at the master by capturing images at a detection set on the master when the LEDs on the LED ring 1300 are flashing. The image 1400 is compared to the known pattern and the relative distance between the master and slave is determined.

In FIG. 14B, the master (not shown) and slave 204 are spaced a longer distance from each other. The image 1402 is created as discussed above. The image 1400 from FIG. 14A shows an LED pattern detected by the master detection set that is sparser and spread in a larger area than the denser pattern spread in a smaller area of that shown in the image 1402 in FIG. 14B.

Figure 15A:
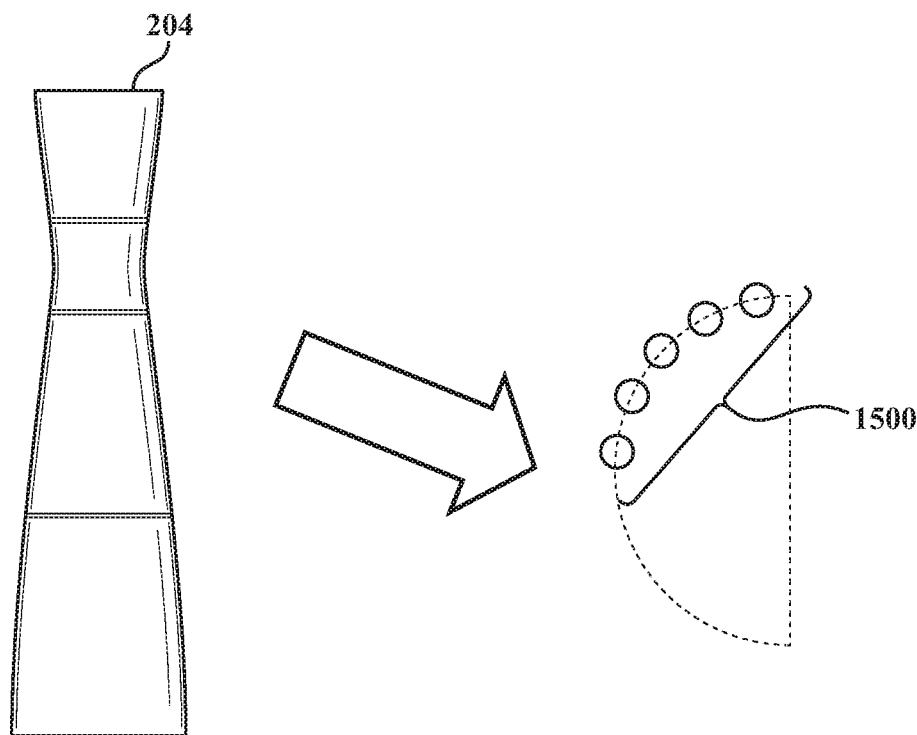
FIG. 15A is an example of a detected LED pattern.
Figure 15B:
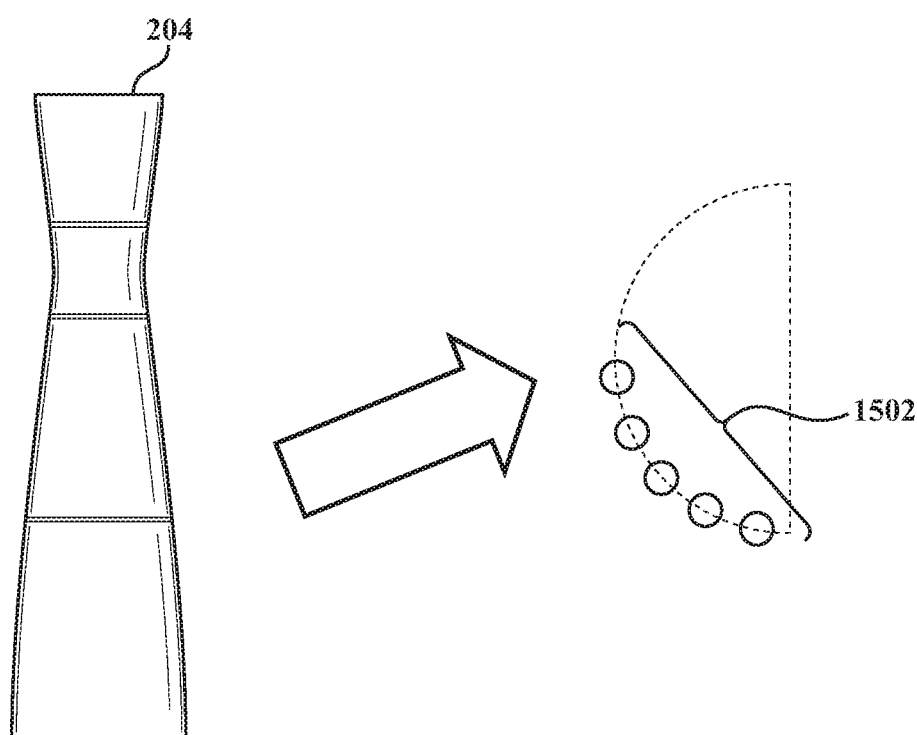
FIG. 15B is an example of a detected LED pattern.

FIG. 15A and FIG. 15B show examples of LED patterns captured by the master (not shown) when the slave 204 is not directly horizontally across from the master and is at different relative angles to the master. In FIG. 15A the slave 204 is positioned at an angle above a side of the master. The LED pattern 1500 will be detected on an upside area of the master. In FIG. 15B the slave is positioned at an angle below a side of the master. The LED pattern 1502 is detected on a bottom area of the master.

The electronic device has, stored in memory, the database of known, calibration patterns that relate to specific distances between the master and the slave. For example, a calibration pattern is stored for a master and slave pair that are spaced two feet apart, a calibration pattern is stored for a master and slave pair that are spaced five feet apart, a calibration pattern is stored for a master and slave pair that are spaced 10 feet, and so on. When comparing the detected pattern with the calibration patterns, a match will indicate the distance and relative angle between the master and the slave. When a match is not made to a calibration pattern in the database, the electronic device applies interpolation to determine the distance and relative angle.

Figure 16:
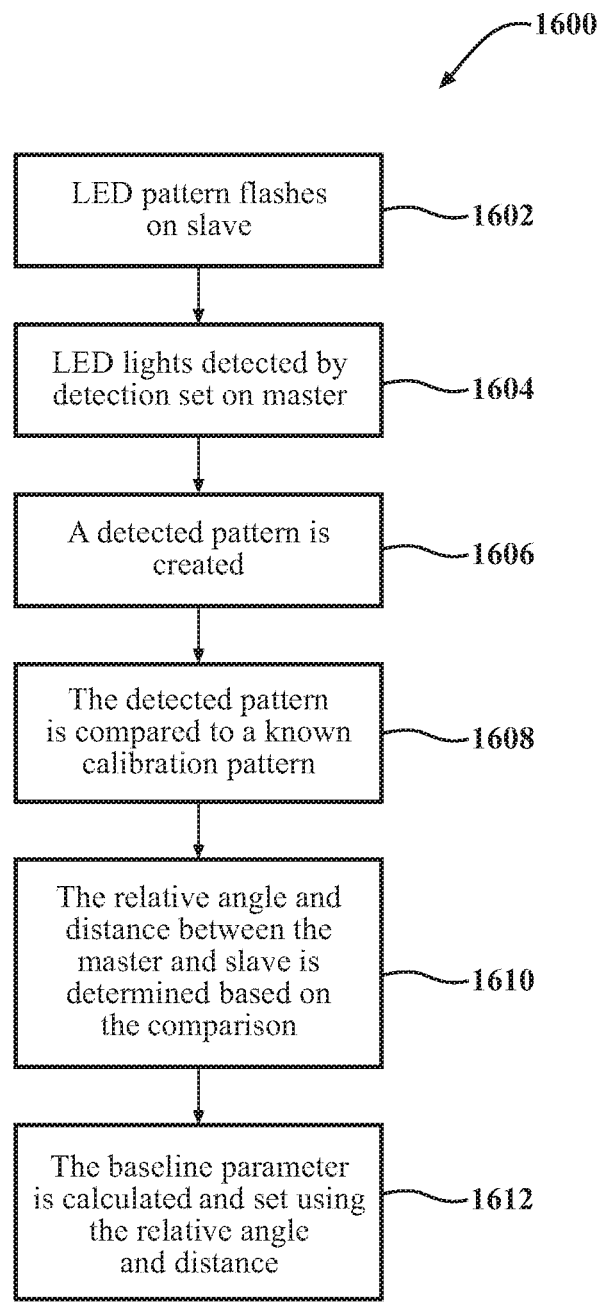
FIG. 16 is a flow chart of a method for autocalibration.

FIG. 16 is a flow chart 1600 of a method for depth detection and calibration. The LED ring on the slave is activated to flash the light sources, for example LEDs, one at a time consecutively 1602. A detection set on the master detects the light points 1604 and creates a detected pattern 1606. The detected pattern is compared 1608 to the database of known, calibrated patterns. Based on the comparison, a match or applying interpolation, a distance and relative angle of the master and the slave is determined 1610. The baseline parameter, D1, is calculated and set 1612 using the distance and relative angle determined in step 1610. A triangle function may be used to calculate the baseline parameter, D1, as discussed earlier herein with reference to FIGS. 3 and 12.

In the foregoing specification, the present disclosure has been described with reference to specific exemplary embodiments. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present disclosure, in addition to those not specifically recited, may be varied or otherwise particularly adapted to specific environments, manufacturing specifications, design parameters or other operating requirements without departing from the general principles of the same.

What is claimed is:

1. A method, comprising:
    tracking a position node for one or more moving objects, the step of tracking a position node includes:
    scanning an area for one or more moving objects,
    detecting one or more moving objects in the area,
    creating a temporary position node around the one or more detected moving objects;
    searching a node pool for an existing position node nearby the temporary position node;
    setting a timer for the existing position node that is nearby the temporary position node, the timer has a predetermined time limit;
    for a temporary position node that is not nearby an existing position node, creating a new position node that is added to the node pool;
    setting a timer associated with the new position node, the timer associated with the new position node has a predetermined time limit; and
    position nodes having timers under their predetermined time limit are maintained in the node pool, the position nodes having timers over their predetermined time limit are delisted from the node pool.

2. The method of claim 1, wherein the timer associated with the existing position node will exceed its predetermined time limit when no movement of the objects in the existing position node is detected before expiration of the timer associated with the existing position node, when the timer associated with the existing position node exceeds its predetermined time limit, the existing position node is delisted from the node pool.

3. The method of claim 1, wherein when movement of at least one of the objects in the existing position node is detected before expiration of the timer associated with the existing position node, the timer associated with the existing position node is reset to the predetermined time limit and the existing position node remains in the node pool.

4. The method of claim 1, wherein when movement of at least one of the objects in the existing position node is detected outside of, but nearby, the existing position node, a new position node is created replacing the existing position node and a timer associated with the new position node is set, the existing position node is delisted from the node pool.

5. The method of claim 1, wherein when movement is detected of at least one of the objects in the existing position node to a position outside of the existing position node, a new position node is created to replace the existing position node, a tinier associated with the new position node is set, and the existing position node remains for a duration of the timer associated with the existing position node.

6. The method of claim 1, wherein when there are two or more existing position nodes in the node pool and when movement is detected of one or more objects close to each other, the two or more existing position nodes are combined into one position node, a timer associated with the one position node will be reset and the other existing position nodes will be delisted from the node pool.

7. A system, comprising:
a processor;
a detection set having at least one dynamitic vision sensor for detecting moving objects;
the processor including computer-readable instructions stored in non-transitory memory for:
scanning, using the detection set, an area for moving objects;
detecting, using the detection set, one or more moving objects in the area;
creating a temporary position node around the detected one or more moving objects;
searching a node pool for an existing position node nearby the temporary position node;
setting a timer associated with the existing position node when the temporary position node is determined to be nearby the existing position node, the timer has a predetermined time limit;
creating a new position node when the temporary position node is determined not to be nearby the existing position node;
adding the new position node to the node pool;
setting a timer associated with the new position node, the timer has a predetermined time limit;
tracking position nodes having timers that are within their predetermined time limit; and
delisting existing position nodes with expired timers over their predetermined time limit.

8. The system of claim 7, wherein the processor includes further instructions for:
determining when none no movement of the objects in the existing position node is detected before expiration of the timer associated with the existing position node; and
delisting the existing position node from the node pool.

9. The system of claim 7, wherein the processor includes further instructions for:
determining when movement of at least one of the objects in the existing position node is detected before expiration of the timer associated with the existing position node; and
resetting the timer associated with the existing position node.

10. The system of claim 7, wherein the processor includes further instructions for:
determining when movement of at least one of the objects in the existing position node is detected outside of, but remains nearby, the existing position node;
creating a new position node to replace the existing position node;
setting a timer associated with the new position node; and
delisting the existing position node from the node pool.

11. The system of claim 7, wherein the processor includes further instructions for:
determining when movement is detected of at least one of the objects in the existing position node to a position outside of the existing position node;
creating a new position node to replace the existing position node
setting a timer associated with the new position node; and
continuing to track the existing position node for a duration of the timer associated with the existing position node.

12. The system of claim 7, wherein the processor includes further instructions for determining when there are two or more existing position nodes in the node pool and one or more objects come close to each other, combining the two or more existing position nodes into one of the existing position nodes, resetting a timer associated with the one of the existing position nodes; and delisting from the node pool the other existing position nodes that were combined into the one of the existing position nodes.

13. A method, comprising:
scanning an area for moving objects;
detecting one or more moving objects;
creating a temporary position node around the detected, one or more moving objects;
searching a node pool for an existing position node nearby the temporary position node;
setting a timer associated with the existing position node when the temporary position node is determined to be nearby the existing position node, the timer has a predetermined time limit;
creating a new position node when the temporary position node is determined not to be nearby the existing position node;
adding the new position node to the node pool;
setting a timer associated with the new position node, the timer has a predetermined time limit;
tracking new position nodes with timers that are within their predetermined time limit; and
delisting existing position nodes with timers that are over their predetermined time limit.

14. The method of claim 13, wherein when none of the objects in the existing position node move before expiration of the timer associated with the existing position node, the method further comprises delisting the existing position node from the node pool.

15. The method of claim 13, wherein when at least one of the objects in the existing position node moves before expiration of the timer associated with the existing position node, the method further comprises resetting the timer associated with the existing position node.

16. The method of claim 13, wherein when at least one of the objects in the existing position node moves outside of, but remains nearby, the existing position node, the method further comprises:
creating a new position node to replace the existing position node;
setting a timer associated with the new position node, the timer having a predetermined time limit; and
delisting the existing position node from the node pool.

17. The method of claim 13, wherein when movement is detected for at least one of the objects in the existing position node to a position outside of the existing position node, the method further comprises:
creating a new position node to replace the existing position node;
setting a timer associated with the new position node, the timer having a predetermined time limit; and
continuing to track the existing position node for a duration of the timer associated with the existing position node.

18. The method of claim 13, wherein when there are two or more existing position nodes in the node pool and movement is detected for one or more objects close to each other, the method further comprises:
combining the two or more existing position nodes into one of the existing position nodes;

resetting a timer associated with the one of the existing position nodes; and delisting from the node pool the other existing position nodes that were combined into the one existing position node.

\* \* \* \* \*

UNITED STATES PATENT AND TRADEMARK OFFICE
CERTIFICATE OF CORRECTION

PATENT NO. : 11,393,101 B2
APPLICATION NO. : 16/799731
DATED : July 19, 2022
INVENTOR(S) : Mien Chin Chen and Sagar Shelke It is certified that error appears in the above-identified patent and that said Letters Patent is hereby corrected as shown below:

In the Claims

Column 12, Claim 5, Line 61, replace with "node, a timer associated with the new position node is set,".

Column 13, Claim 7, Line 31, replace with "delisting existing position nodes with timers".

Signed and Sealed this
Eighteenth Day of October, 2022

Katherine Kelly Vidal
*Director of the United States Patent and Trademark Office*